US007332999B2

(12) United States Patent
Fitzgibbon

(10) Patent No.: US 7,332,999 B2
(45) Date of Patent: *Feb. 19, 2008

(54) SYSTEM AND METHOD FOR OPERATING MULTIPLE MOVEABLE BARRIER OPERATORS

(75) Inventor: James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 442 days.

This patent is subject to a terminal disclaimer.

(21) Appl. No.: 10/993,266

(22) Filed: Nov. 19, 2004

(65) Prior Publication Data

US 2005/0232694 A1 Oct. 20, 2005

(51) Int. Cl.
*H04Q 1/00* (2006.01)

(52) U.S. Cl. ............... 340/5.71; 340/5.64; 340/825.72; 49/25

(58) Field of Classification Search ............... 340/5.71, 340/825.72, 825.69, 5.8, 545.1, 5.65, 5.64, 340/5.22, 10.3, 521, 5.61; 455/420, 100; 375/211; 49/25, 68
See application file for complete search history.

(56) References Cited

U.S. PATENT DOCUMENTS

| | | | | |
|---|---|---|---|---|
| 6,002,332 | A * | 12/1999 | King | 340/545.1 |
| 6,593,856 | B1 * | 7/2003 | Madau | 340/825.69 |
| 6,963,266 | B2 * | 11/2005 | Palomaki et al. | 340/5.22 |
| 7,142,849 | B2 * | 11/2006 | Neuman | 455/420 |
| 2005/0184854 | A1 * | 8/2005 | Mullet et al. | 340/5.22 |

* cited by examiner

*Primary Examiner*—Edwin C. Holloway, III
(74) *Attorney, Agent, or Firm*—Fitch, Even, Tabin & Flannery

(57) ABSTRACT

A first moveable barrier is actuated by using a first moveable barrier operator. Responsive to the receipt of a signal initiating actuation of the first moveable barrier, a wireless signal is transmitted from the first moveable barrier to a second moveable barrier operator. The signal is received at the second moveable barrier operator and the second moveable barrier operator is controlled in response to receiving the signal.

27 Claims, 5 Drawing Sheets

SYSTEM AND METHOD FOR OPERATING MULTIPLE MOVEABLE BARRIER OPERATORS

FIELD OF THE INVENTION

The field of the invention relates to moveable barrier operators and, more specifically, operating multiple moveable barrier operators.

BACKGROUND OF THE INVENTION

Different types of moveable barrier operators have been sold over the years and these systems have been used to actuate various types of moveable barriers. For example, garage door operators have been used to move garage doors while gate operators have been used to open and close gates.

Such barrier movement operators may include a wall control unit, which is connected to send signals to the head unit thereby causing the head unit to open and close the barrier. In addition, these operators often include a receiver unit at the head unit to receive wireless transmissions from a hand-held code transmitter or from a keypad transmitter, which may be affixed to the outside of the area closed by the barrier or other structure.

In many situations, multiple moveable barrier systems need to be sequentially actuated. For example, a gate operator may operate a gate that is placed at the end of a driveway and a garage door operator may be used to move a garage door at the residence. In this case, both the gate operator and the garage door operator must be activated when a vehicle attempts to enter the garage from the street or leave the garage and enter the street. In other cases, gated communities exist where a gate operator is used to open or close a gate at the entrance of the community and garage door operators are used to move the garage doors at the residences of the community.

Previous systems required the use of separate devices to activate the multiple barrier movement operators. A user had to first activate the first barrier operator and then activate the second barrier operator. In one example, in a system having a gate and a garage door, the user first activated the gate operator with one transmitter and then activated the garage door operator with a second transmitter. These approaches were inconvenient for users because they required the maintenance and use of two transmitters and two user actions.

SUMMARY OF THE INVENTION

A system for providing communications between multiple barrier operators allows a single transmitter to be employed to operate multiple moveable barrier operators and thereby, open and close the associated moveable barriers. Since a single transmitter is employed, the approach is simple to use and enhances user convenience.

In many of these embodiments, a first moveable barrier is actuated by using a first moveable barrier operator. Responsive to the receipt of a signal initiating actuation of the first moveable barrier, a wireless signal is transmitted from the first moveable barrier to a second moveable barrier operator. The wireless signal is received at the second moveable barrier operator and the second moveable barrier operator is controlled in response to receiving the wireless signal.

The first moveable barrier operator may be a gate operator or a door having a lock. The second moveable barrier operator may be a gate operator, a garage door operator, or a door having a lock. Other examples of operators are possible.

A direction of travel through the first moveable barrier may be determined. The direction of travel through the first barrier may be transmitted to the second moveable barrier operator and used to make actuation decisions.

Furthermore, an action to perform at the second movable barrier may be identified in response to receiving the signal. The action may be that the second barrier should be opened or closed. In addition, the direction of travel of the second moveable barrier may be reversed.

The second operator may also check the state of the second barrier and determine that this barrier is already open when the second operator receives actuation information from the first barrier operator and that the second barrier need not be opened again. In this case, directional information provided by the first barrier operator is discarded or potentially stored for future operational decisions. On the other hand, it may open the second barrier if closed or close the second barrier if open if the current state of the second barrier is the opposite of the proposed state.

In others of these embodiments, a first moveable barrier operator is activated by a transmitter at a vehicle which transmits a first signal. Responsive to the actuation of the first moveable barrier operator and receipt of the first signal, a second signal is transmitted from the first moveable barrier operator to at least one second moveable barrier operator. The second signal is received at the least one second moveable barrier operator and the at least one second moveable barrier operator is actuated in response to receiving the second signal.

The signal from the first moveable barrier operator to the second moveable barrier operators may be via a wireless connection. The first moveable barrier operator may be a gate operator or a door having a lock. The second moveable barrier operator may be a gate operator, a garage door operator, and a door having a lock. Other examples of operators are possible.

The direction of travel through the first moveable barrier may be sensed. Information indicating the direction of travel of the vehicle through the first barrier may be sent to the second barrier operator. Further, an action to perform at the second movable barrier as a result of receiving the second signal may be determined. The direction of travel through the first moveable barrier may be determined by using devices such as loop detectors, photobeams, the combination of a photobeam and a loop detector, and a camera.

The at least one second barrier operator may include a plurality of second moveable barrier operators, and a second moveable barrier may be selected to be actuated from amongst the plurality of operators. The second moveable barrier operator may be selected based upon the type of the first signal, an identification of the first signal, an identification of a button activated on the transmitter, or an identification of the first moveable barrier operator. Other factors may also be used to make the choice.

A coded signal may be transmitted to the second moveable barrier operator such that only one of plurality of the second moveable barrier operators responds to the signal. The coded signal may cause the second moveable barrier to be opened or closed.

Thus, the present approaches allow multiple moveable barriers to be actuated by using one transmitter and one action. Multiple transmitters are eliminate thereby making opening moveable barriers simple and enhancing the user experience.

Skilled artisans will appreciate that elements in the figures are illustrated for ease of understanding and have not necessarily been drawn to scale. For example, the dimensions of some of the elements in the figures may be exaggerated relative to other elements to help to improve understanding of various embodiments of the present invention. Also, common but well-understood elements that are useful in a commercially feasible embodiment are often not depicted in order to facilitate a less obstructed view of the various embodiments of the present invention.

DESCRIPTION OF THE PREFERRED EMBODIMENTS

Figure 1:
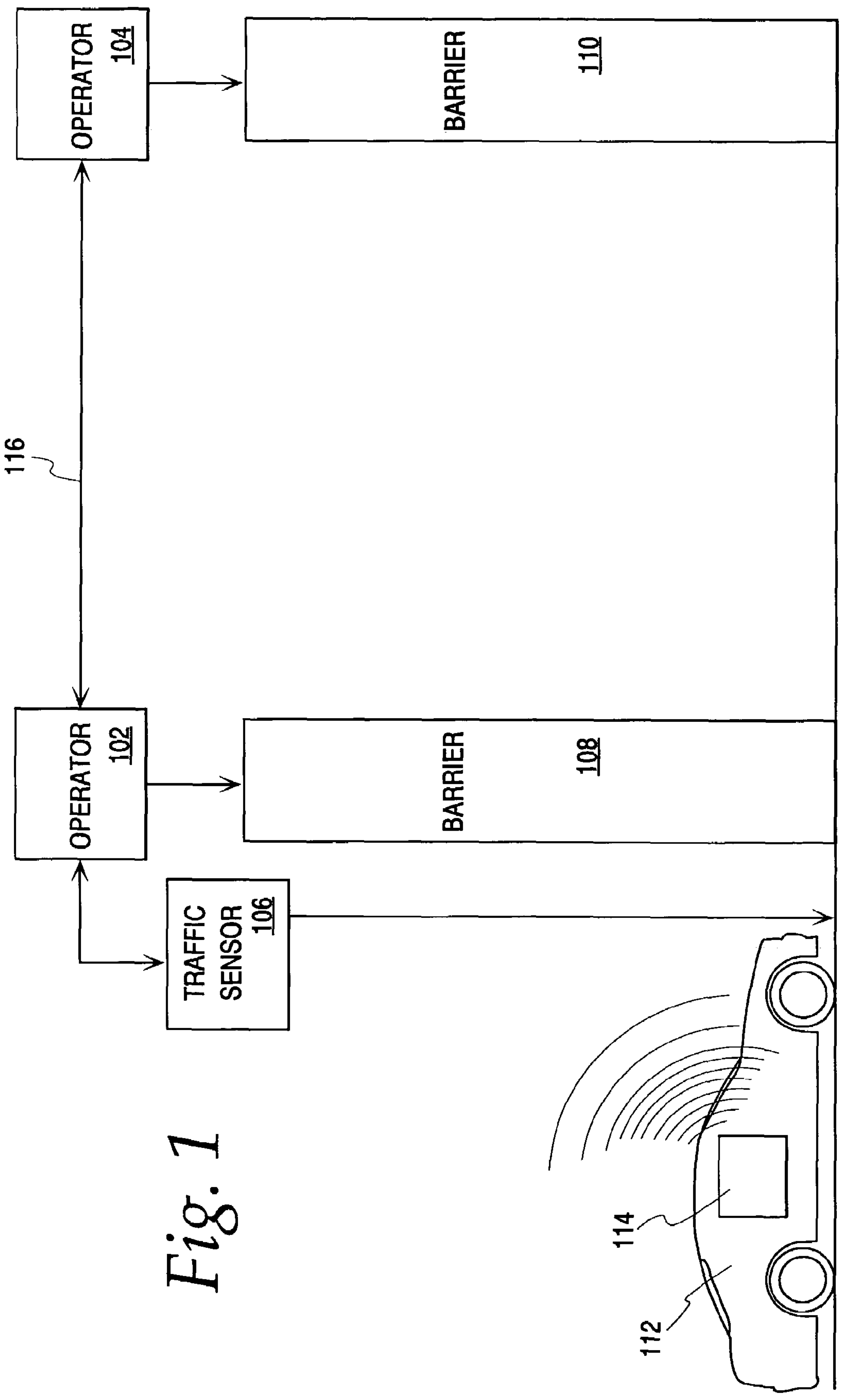
FIG. 1 is a block diagram showing one example of a system for using multiple barrier operators according to the present invention.

Referring now to the drawings and especially FIG. 1, an example of a system employing multiple moveable barrier operators is described. The system includes a first operator 102 and second operator 104, which are coupled together via a communication link 116. The operators 102 and 104 are coupled to barriers 108 and 110, respectively. A traffic direction sensor 106 is located in the vicinity of the barrier 108.

The operators 102 and 104 may be any type of moveable barrier operators. For example, they may be garage door operators, gate operators, or doors having a lock. The barriers 108 and 110 may be any type of barriers, for example, garage doors, sliding gates, swinging gates, fire doors, or shutters. Other examples of moveable barriers are possible.

The traffic direction sensor 106 is a device that monitors the direction of the movement of vehicular traffic through the barrier 108, for instance, whether vehicles are entering through the barrier 108 or leaving from the barrier 108. The traffic direction sensor 106 may include loop detectors, two photobeams detectors, the combination of a photobeam detector and a loop detector, or a camera. Other types of traffic direction detection devices may also be used.

In one example of the operation of the system of FIG. 1, a vehicle 112 having a transmitter 114 enters the vicinity of the barrier 108. The operator of the vehicle 112 actuates the transmitter 114 by, for example, pressing a button on the transmitter 114. The transmitter 114 sends a signal, which is received at the operator 102. Alternatively, other devices such as key cards inserted into key card operators may be used in place of the transmitter 114.

Responsive to the receipt and validation of a signal at the first moveable barrier operator 102, a signal is transmitted from the first moveable barrier 102 to the second moveable barrier operator 104 via the communication link 116. The communication link 116 may be a wired link or a wireless link.

The signal transmitted via the link 116 is received at the second moveable barrier operator 104 and the second moveable barrier operator 104 is controlled in response to receiving the signal. The second moveable barrier operator may cause the barrier 110 to be opened or closed. Similarly, receipt of the signal from the transmitter 114 at the operator 102 may cause the barrier 108 to be opened or closed.

The link 116 may utilize a hard wire connection, radio frequency (RF) signals, Infrared (IF) signals, a power line carrier signal, or any other type of communication link. The communications along the link 116 can be mono-directional, for instance, a command from the first operator 102 to the second operator 104 to open or close the barrier 110. In addition, the link 116 can include the use of bidirectional signals, for example, status signals that can be sent from the second operator 104 to the first operator 102 for later display and/or use at the first barrier 108. The status signals sent from the second barrier 104 may be used to have actuation of the first barrier conditional on the status of the second barrier 110. For example, if the second barrier 110 were set to a "vacation mode" status, the first operator would not send an open request to the second barrier operator 104.

The first operator 102 may be selective of the communication of a command to the second operator 104 according to various factors. For example, if the command received was from one type of transmitter (or button), both the first and second barriers 108 and 110 would be actuated. If the type of transmitter (or button) was a different type, only the first barrier 108 could be actuated. In still another example, a third type of transmitter (or button) would cause only the barrier 110 to be actuated and the command to actuate the barrier 110 would be relayed from the first operator 102 to the second operator 104.

The sensor 106 may be used to determine the direction of traffic through the first barrier. As mentioned, various devices can be used to determine this information. For example, loop detectors can be used showing the direction of traffic by the order of activation. In another example, photobeam devices may be used around the barrier 108 to determine the direction of traffic. In still another example, a camera may be used to determine the direction of traffic through the barrier 108. Once the direction of the traffic is determined, this information may be used by the first operator 102 to determine an appropriate command (open or close) to send to the second operator 104.

The second operator 104 may also identify the current state of the second barrier 110 (opened or closed) and determine that barrier 110 is already open when the operator 104 receives actuation information from the first barrier operator 102 and, therefore, need not be opened again. In this case, directional information provided by the first barrier operator 102 is discarded. On the other hand, the second operator 104 may open the barrier 110 if closed or close the barrier 110 if open if the current state is the opposite of the proposed state.

Figure 2:
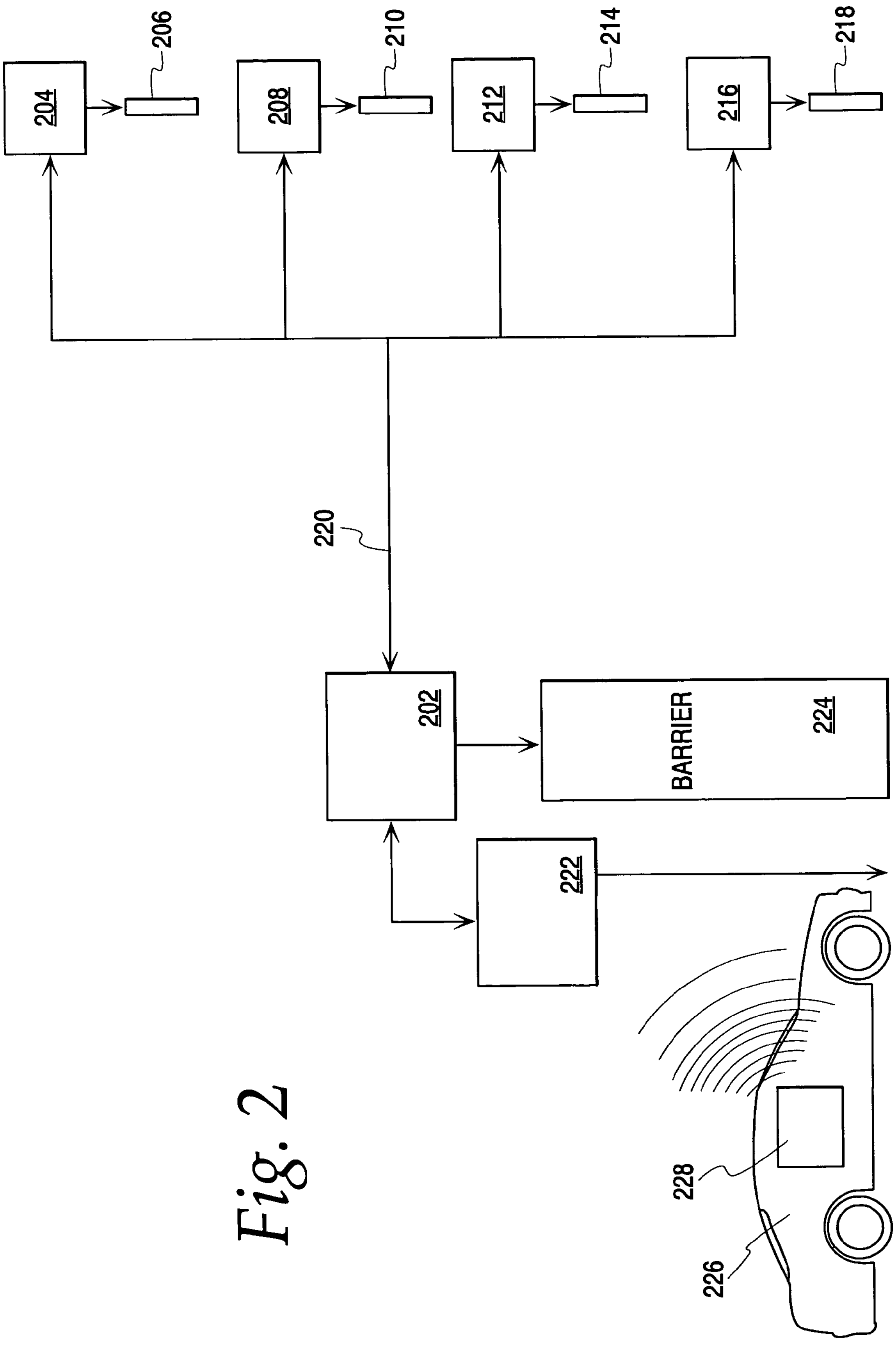
FIG. 2 is a block diagram showing another example of a system for using multiple barrier operators according to the present invention.

Referring now to FIG. 2, an example of another system employing multiple moveable barrier operators is described. The system includes a first operator 202 and a plurality of second operators 204, 208, 212, and 216, which are coupled together via a communication link 220. The operators 202, 204, 208, 212, and 216 are coupled to barriers 224, 206, 210, 214, and 218. A traffic direction sensor 222 is placed in the vicinity of the barrier 224. Although four second operators are shown in the system of FIG. 2, it will be understood that any number of second operators may be employed.

The operators 202, 204, 208, and 212 may be any type of moveable barrier operator. For example, they may be garage door operators, gate operators, or doors having a lock. The barriers 224, 206, 210, 214, and 218 may be any type of barriers, for example, garage doors, sliding gates, swinging gates, fire doors, or shutters. Other examples of moveable barriers and barrier operators are possible.

The traffic direction sensor 222 is a device that monitors the movement of vehicular traffic through the barrier 224. The traffic direction sensor 222 may be at least one loop detector, at least two photobeams, a photobeam and a loop detector, or a camera. Other types of traffic direction detection devices may also be used.

In one example of the operation of the system of FIG. 2, a vehicle 226 having a transmitter 228 enters the vicinity of the barrier 224. The operator of the vehicle 226 actuates the transmitter 228 by, for example, pressing a button on the transmitter 228. The transmitter 228 sends a signal, which is received at the operator 202 and which includes information identifying the user or transmitter. Alternatively, the user may insert a key card into a key card operator if the first barrier 224 is a gate.

The operator 202 may identify the transmitter or keycard used to open the barrier 224. The operator 202 then can decide based on information previously taught to the operator which of the barriers 206, 210, 214, or 218 to actuate. In this regard, the operator 202 may send a coded message via the communication link 220 that is received at the operators 204, 208, 212, and 216. However, only the barrier operator or operators that are programmed to respond to the code will actuate their corresponding barrier. The command may be delayed in the case of where the vehicle 226 needs time to reach the vicinity of the barriers 206, 210, 214, or 218 such as when the first barrier is a gate and the other barriers are garage doors at homes within a gated community.

The link 220 can be in the form of a hard wire connection, radio frequency (RF) signals, Infrared (IF) signals, power line carrier or any other type of communication link. The communications along the link 220 can be mono-directional, for instance, a command from the first operator 202 to the second operators 204, 208, 212, and 216 to open or close the barriers 206, 210, 214 or 218. In addition, the link 220 can include the use of bi-directional signals, for example, status signals that can be sent from the second operators 204, 208, 212, and 216 to the first operator 202 for later display at the first barrier 224. The status signals sent from the second barriers 206, 210, 214, and 218 may be used to have interaction of the first barrier conditional on the status of the second barriers 206, 210, 214, and 218. For example, if the second barrier 206 were set to a "vacation mode" status, the first operator would not send an open request to the second barrier operator 204.

The first operator 202 may be selective of the communication of a command to the second operators 204, 208, 212, and 216 according to various factors. For example, if the command was from one type of transmitter (or button), both the first and second barriers 224 and 206 would be actuated. If the type was another type, only the first barrier 224 would be actuated. In still another example, a third type of transmitter would cause only the barrier 206 to be actuated and the command to actuate the barrier 224 would be relayed from the first operator 202 to the second operator 204.

The sensor 222 may be used to determine the direction of traffic through the first barrier. As mentioned, various devices can be used to determine this information. For example, loop detectors can be used showing the direction of traffic by the order of activation or in a single loop system the detection of the vehicle or not describes where the vehicle is and, therefore, the direction. In another example, photobeam devices may be used around the barrier 108 to show the direction of traffic. In still another example, a camera may be used to determine the direction of traffic through the barrier 224. Once the direction of the traffic is determined, this information may be used by the first operator 202 to determine an appropriate command (open or close) to send to the appropriate second operator.

FIGS. 3-7 illustrate various communication exchanges between a first barrier operator and a second barrier operator or operators. It will be understood that the communication sequences illustrated in these figures can be modified or combined. In other words, the message sequence shown in one figure could be modified to include some or all of the additional message sequences described in the other figures.

In one example of the components used for the systems illustrated in FIGS. 3-7, the first operator may be a gate operator and the first barrier may be a gate. In addition, the second or additional operators may be garage door operators and the second or additional barriers may be garage doors. However, it will be understood that any type of operator or barrier may be used in place of these examples.

Figure 3:
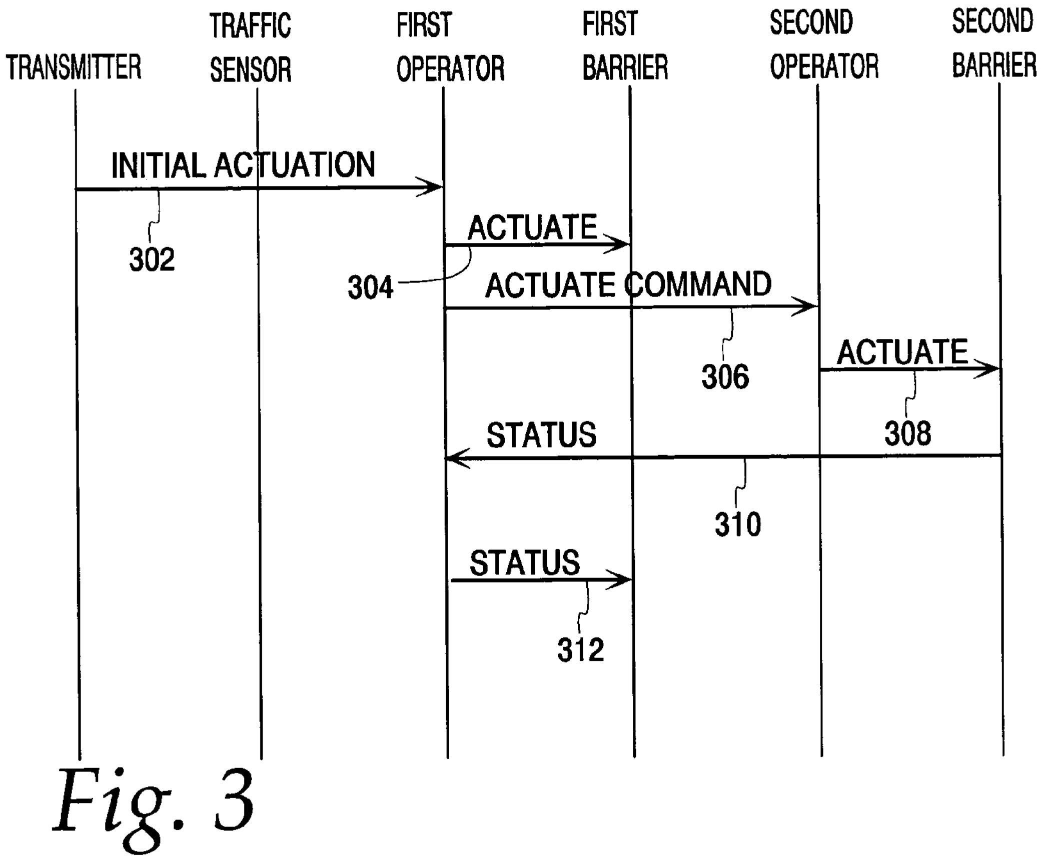
FIG. 3 is a flowchart showing one example of communication flow in a system employing multiple barrier operators according to the present invention.

Referring now to FIG. 3, an example of the communication exchange in a system employing multiple moveable barrier operators is described. At step 302, an initial actuation signal is sent from the transmitter and is received at the first operator. At step 304, the first operator sends an actuate (open or close) signal to the first barrier. At step 306, the first operator sends an actuate command to the second operator over a communication link.

At step 308, the second operator, in response to receiving the actuate command, sends an actuate (open or close) signal to the second operator. At step 310, the second barrier sends a status message to the second operator and then to the first operator. The status message may indicate the state of the barrier (e.g., opened or closed) or the mode the barrier (e.g., vacation mode). At step 312, the status message is sent to a display at the first barrier where the contents of the message can be displayed to a user at or around the first barrier (e.g., on a screen attached to a wall or post) or used at the first barrier for some other purpose.

Figure 4:
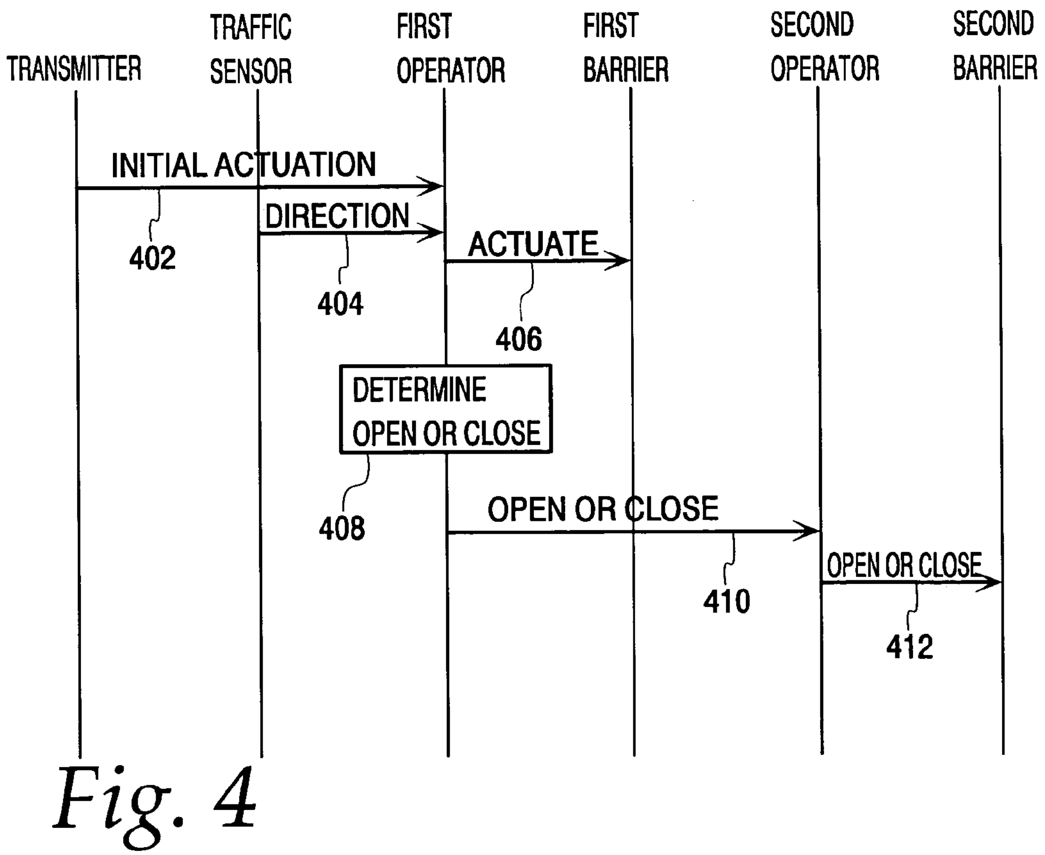
FIG. 4 is a flowchart showing another example of communication flow in a system employing multiple barrier operators according to the present invention.

Referring now to FIG. 4, another example of the communication exchange in a system employing multiple moveable barrier operators is described. At step 402, a transmitter sends an initial actuation signal to the first operator. At step 404, the sensor sends a direction of traffic signal to the first operator. At step 406, the first operator sends an actuation signal to the first barrier.

At step 408, the first operator determines whether to send an open or close signal to the second operator. This decision may be based on the direction of traffic as specified in step 404 to the first operator. At step 410, the open or close message is sent to the second barrier operator. At step 412, the open or close command is sent to the second barrier to actuate this barrier.

Figure 5:
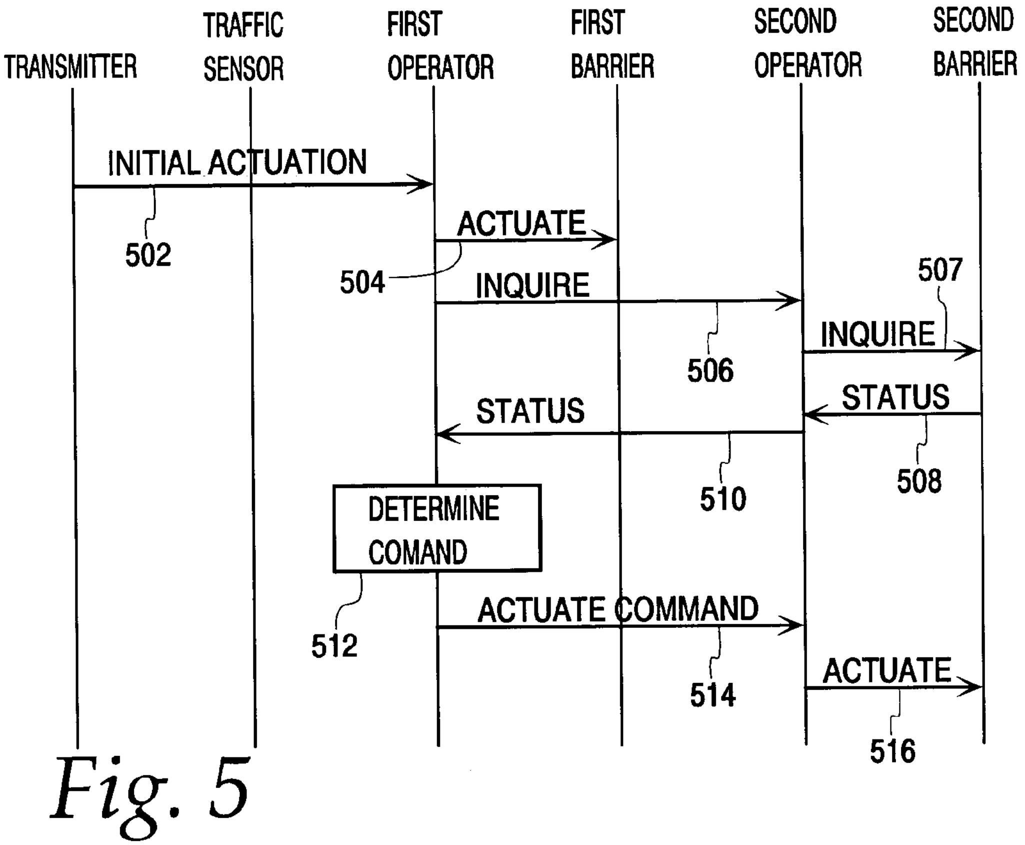
FIG. 5 is a flowchart showing another example of communication flow in a system employing multiple barrier operators according to the present invention.

Referring now to FIG. 5, another example of the communication exchange in a system employing multiple moveable barrier operators is described. At step 502, an initial actuation signal is sent from the transmitter to the first operator. At step 504, an actuation signal is sent from the first operator to the first barrier to move the first barrier.

At step 506, an inquire message is sent from the first operator to the second operator. The purpose of the inquire message is to determine the status, state, or condition of the second barrier from the second operator. At step 507, the second operator makes an inquiry to the second barrier and at step 508 the second barrier responds with the status. This status is communicated from the second operator to the first operator at step 510.

At step 512, the first operator determines the actuation command (open or close) to be sent based upon the status. At step 514, the actuation command is sent from the first operator to the second operator. At step 516, the actuation command (open or close) is sent to the second barrier and the second barrier is actuated according to the command.

Figure 6:
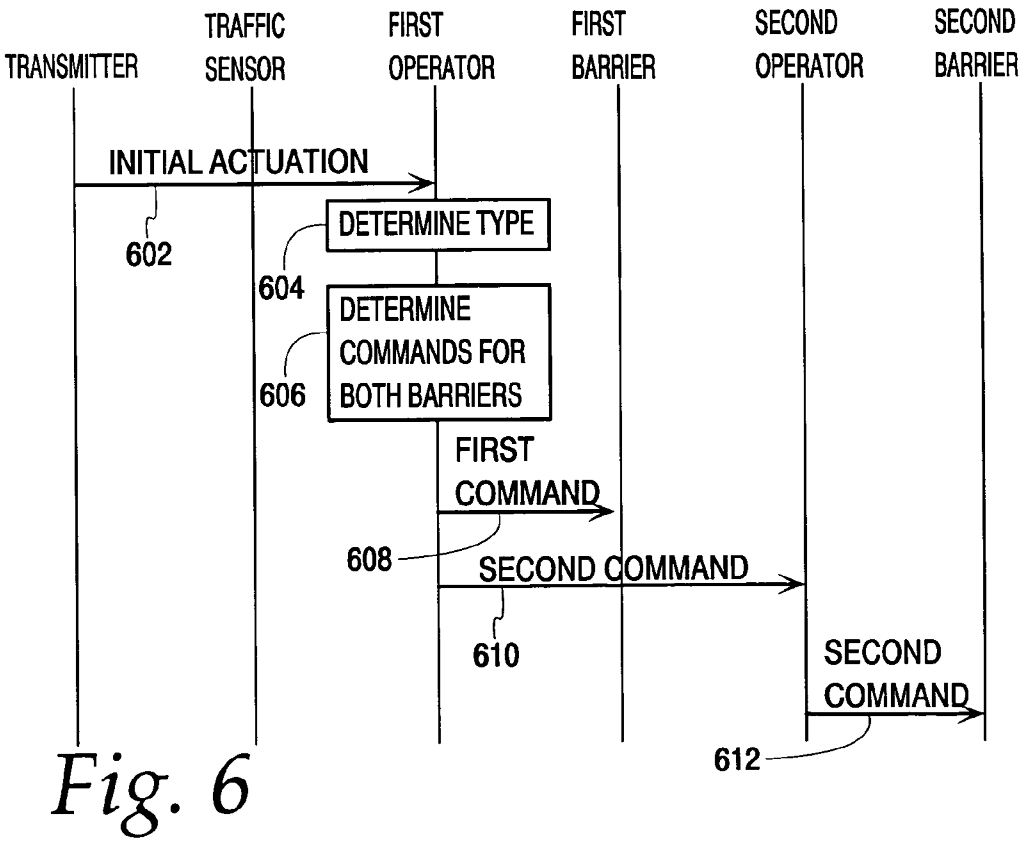
FIG. 6 is a flowchart showing another example of communication flow in a system employing multiple barrier operators according to the present invention.

Referring now to FIG. 6, another example of the communication exchange in a system employing multiple moveable barrier operators is described. At step 602, an initial actuation signal is sent from the transmitter to the first operator. The signal includes a type field that identifies the type of transmitter. At step 604, the first operator identifies the type of transmitter from the message. At step 606, the first operator determines a first command to actuate the first barrier and a second command to actuate a second barrier. The commands may be to open, close, or do nothing with the barrier. At step 608, the first command is sent to the first barrier. At step 610 the second command is sent to the second operator and at step 612 the second command is sent to and actuates the second barrier.

Figure 7:
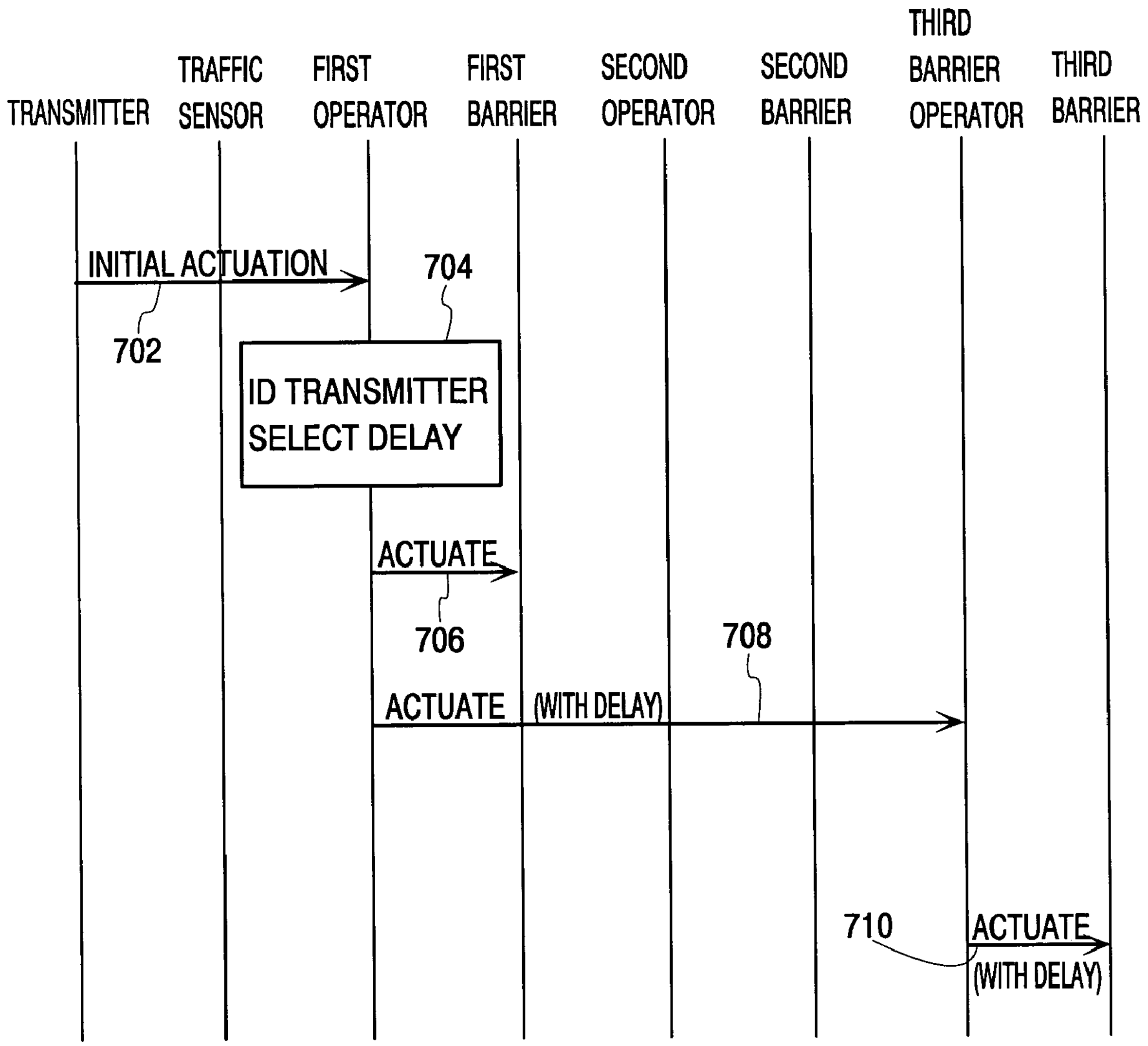
FIG. 7 is a flowchart showing another example of communication flow in a system employing multiple barrier operators according to the present invention.

Referring now to FIG. 7, another example of the communication exchange in a system employing multiple moveable barrier operators is described. At step 702, an initial actuation signal is sent from a transmitter to a first operator. At step 704, the first operator identifies the transmitter that sent the message by using information included in the message. The operator also identifies the destination operator based upon the identity of the sender. The operator also selects a delay time to delay the sending of an actuate message to the destination. At step 706, the first operator sends an actuate command to the first barrier.

In this case, the first operator determines that the actuate command should be sent to a third operator, for example, located at the home of the user who transmitted the signal from the transmitter. At step 708, the first operator sends the actuate message (after a delay has expired) to the third operator. At step 710, the third operator sends an actuate message to the third barrier, which is opened or closed according to the message.

Thus, the present approaches allow multiple moveable barriers to be actuated by using one transmitter and one action. Multiple transmitters are eliminate thereby making opening moveable barriers simple and enhancing the user experience.

While there has been illustrated and described particular embodiments of the present invention, it will be appreciated that numerous changes and modifications will occur to those skilled in the art, and it is intended in the appended claims to cover all those changes and modifications which fall within the true scope of the present invention.

What is claimed is:

1. A method of operating a movable barrier operator comprising:

receiving a first signal having a first initiating actuation command at a first moveable barrier operator, responsively actuating a first moveable barrier responsive to the receipt of a signal initiating actuation of the first moveable barrier, selectively determining and transmitting a wireless signal directly from the first moveable barrier operator to a second moveable barrier operator, the wireless signal having a second initiating actuation command different from the first actuation command; and receiving the wireless signal at the second moveable barrier operator and controlling the second moveable barrier operator in response to receiving the wireless signal.

2. The method of claim 1 wherein transmitting the wireless signal comprises transmitting the wireless signal from a first moveable barrier operator to a second movable barrier, the first movable barrier selected from the group consisting of a gate operator and a door having a lock, the second moveable barrier operator selected from the group consisting of a gate operator, a garage door operator, and a door having a lock.

3. The method of claim 1 further comprising determining a direction of travel of a vehicle through the first moveable barrier.

4. The method of claim 3 comprising transmitting the wireless signal to the second barrier operator indicating the direction of travel of the vehicle through the first barrier and further comprising identifying an action to perform at the second movable barrier in response to receiving the signal.

5. The method of claim 4 comprising identifying at the second moveable barrier that the second barrier should be opened.

6. The method of claim 4 comprising identifying at the second moveable barrier that the second barrier should be closed.

7. The method of claim 6 further comprising reversing a direction of travel of the second moveable barrier.

8. A method of operating movable barrier operators comprising:

transmitting a first signal having a first initiating actuation command from a transmitter and actuating a first moveable barrier operator;

responsive to the actuation of the first moveable barrier operator and receipt of the first signal, selectively determining and transmitting a second signal directly from the first moveable barrier operator to at least one second moveable barrier operator, the second signal having a second initiating actuation command that is different from the first initiating actuation command; and receiving the second signal at the second moveable barrier operator and actuating the at least one second moveable barrier operator in response to receiving the second signal.

9. The method of claim 8 wherein actuating a first moveable barrier operator comprises actuating a garage door operator and transmitting a second signal comprises transmitting the second signal from the garage door operator to a gate operator.

10. The method of claim 8 wherein actuating a first moveable barrier operator comprises actuating a gate operator and transmitting a second signal comprises transmitting the second signal from the gate operator to a garage door operator.

11. The method of claim 8 wherein transmitting the signal to the at least one second moveable barrier operator comprises transmitting the signal over a connection selected from a group comprising a wireless connection and a wired connection.

12. The method of claim 8 wherein transmitting the second signal comprises transmitting the second signal from a first moveable barrier operator to at least one second moveable barrier operator, the first moveable barrier operator selected from the group consisting of a gate operator and a door having a lock, the at least one second moveable barrier operator selected from the group consisting of a gate operator, a garage door operator, and a door having a lock.

13. The method of claim 8 further comprising sensing a direction of travel through the first moveable barrier.

14. The method of claim 13 wherein the second signal comprises information indicating the direction of travel of the vehicle through the first barrier and further comprising determining an action to perform at the at least one second movable barrier as a result of receiving the second signal.

15. The method of claim 13 wherein sensing the direction of traffic through the first moveable barrier is accomplished via devices selected from the group consisting of at least two loop detectors, at least two photobeams, a photobeam and a loop detector, and a camera.

16. The method of claim 8 further comprising reversing a direction of travel of the first moveable barrier.

17. The method of claim 8 wherein transmitting the second signal to the at least one second moveable barrier operator comprises transmitting a signal to a plurality of second moveable barrier operators, the method further comprising selecting a second moveable barrier to actuate from amongst the plurality of second moveable barrier operators.

18. The method of claim 17 wherein selecting the second moveable barrier operator comprises selecting the second moveable barrier operator based upon a criteria selected from the group consisting of a type of the first signal, an identification of the first signal, an identification of a button activated on the transmitter, and an identification of the first moveable barrier operator.

19. The method of claim 17 wherein transmitting the second signal to the second moveable barrier operator comprises transmitting a coded signal such that only one of plurality of the second moveable barrier operators responds to the signal.

20. The method of claim 17 wherein transmitting the signal to the second moveable barrier operator comprises transmitting a coded signal to open the second moveable barrier.

21. The method of claim 17 wherein transmitting the signal to the second moveable barrier operator comprises transmitting a coded signal to close the second moveable barrier.

22. A system for actuating moveable barriers comprising:

a first moveable barrier;

a first moveable barrier operator coupled to the first moveable barrier and communicatively coupled to a wireless connection, the first moveable barrier operator being actuated by a first signal having a first command;

a second moveable barrier;

a second moveable barrier operator coupled to the second moveable barrier and communicatively coupled to the wireless connection; and wherein responsive to the actuation of the first moveable barrier, a wireless signal having a second command different from the first command is directly transmitted over the wireless connection from the first moveable operator to the second moveable barrier operator actuating the second moveable barrier operator.

23. The system of claim 22 wherein the first movable barrier is selected from the group consisting of a gate and a door, the second moveable barrier operator selected from a group consisting of a garage door opener, a gate operator, and a door having a lock.

24. The system of claim 22 further comprising a sensor for determining a direction of travel of a vehicle through the first moveable barrier.

25. The system of claim 24 wherein the second moveable barrier operator receives information indicating the direction of travel of the vehicle through the first moveable barrier and further comprising determining an action to perform at the second movable barrier as a result of receiving the information.

26. The method of claim 24 wherein the first moveable barrier operator is a garage door operator and the second moveable barrier operator is a gate operator.

27. The method of claim 24 wherein the first moveable barrier operator is a gate operator and the second moveable barrier operator is a garage door operator.

* * * * *